(No Model.)

J. W. BOOKWALTER.
ART OF CHURNING.

No. 415,237. Patented Nov. 19, 1889.

Witnesses
Jno. G. Hinkel Jr.
H. S. McArthur

John W. Bookwalter,
Inventor

By Foster Freeman
Attorneys

UNITED STATES PATENT OFFICE.

JOHN W. BOOKWALTER, OF SPRINGFIELD, OHIO.

ART OF CHURNING.

SPECIFICATION forming part of Letters Patent No. 415,237, dated November 19, 1889.

Application filed November 28, 1888. Serial No. 292,135. (No model.)

*To all whom it may concern:*

Be it known that I, JOHN W. BOOKWALTER, a citizen of the United States, and a resident of Springfield, Clark county, Ohio, have invented certain new and useful Improvements in the Art of Churning, of which the following is a specification.

In the ordinary process of churning or separating butter from cream it is common to agitate a body of cream by means of stirrers in the form of plates or blades passing rapidly through the material, or by agitating the vessel containing the material. The result is only partially effective, inasmuch as the movements of the stirrer-blades or of the vessel are communicated to the entire body of cream, and the butter-sacks are broken as much from the friction of one against the other as from the direct impact of the blades, which act with less effect, as they generally strike the material while it is in motion in the same direction as that in which the blades are traveling while enveloped by the material. These results are inevitable in any process in which the entire body of material, or a great portion thereof, is agitated at one time, and the continued presence of the extracted butter with the cream operated upon tends to impair the efficiency of the process.

I have discovered that by operating upon small portions of the material at one time I am enabled to agitate the same more abruptly and violently than would otherwise be possible, and I can thus more effectively and rapidly break up the butter-sacks, and I have devised a means of repeatedly subjecting every portion of the material to this violent action without materially agitating the main mass and of extracting the butter from the liquid as soon as the butter is formed, so that it is not necessarily subjected a second time to the agitating device.

Different appliances may be employed for carrying my improved mode of churning into effect, and I illustrate two apparatus in the accompanying drawings, in which—

Figure 1:
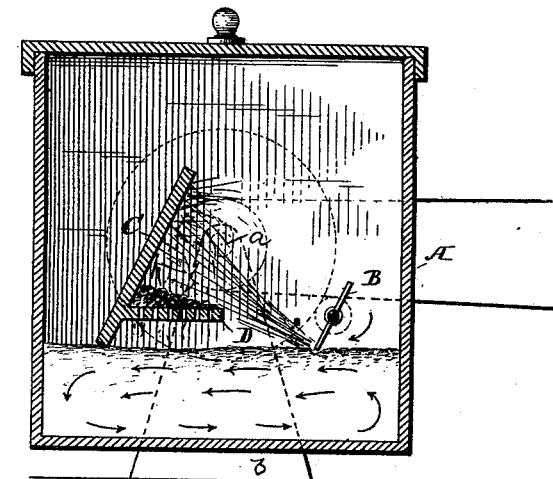
Figure 2:
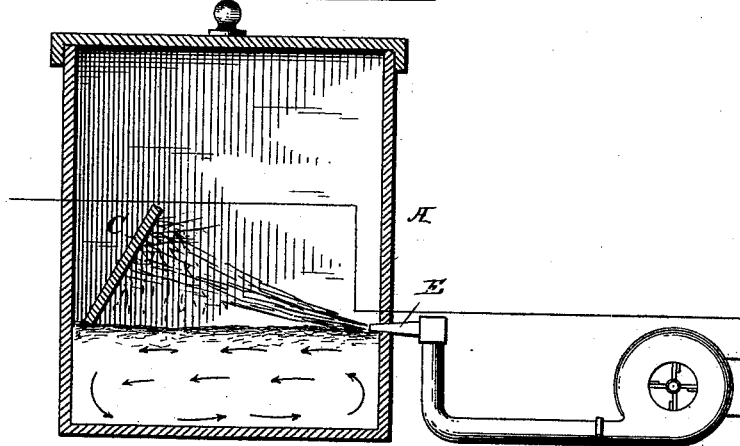
Figure 3:
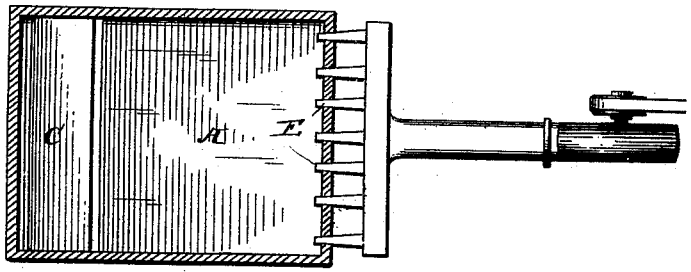

Figure 1 is a sectional elevation showing one form of apparatus that may be used. Fig. 2 is a sectional elevation showing another form of apparatus; and Fig. 3 is a sectional plan on the line 3 3, Fig. 2.

In the apparatus shown in Fig. 1 there is a receptacle A, within which is arranged a striker B, in the form of a bladed shaft, the latter extending through a packed opening to the outside of the receptacle, where it is provided with a pulley to receive a band or gear, by means of which an extremely rapid rotation is imparted to the shaft in the direction of the arrow. Within the receptacle is preferably arranged a dasher board or plate, which may be formed by the side of the receptacle opposite the striker, but, as shown, consists of a slightly-inclined plate C, arranged above the normal level of the cream when placed in the receptacle, and below this plate, above said level, is a perforated plate or shelf D.

The cream to be churned is placed in the receptacle below the plates C D and the striker is put in operation, when the blades will be brought violently and rapidly against the cream, and small portions at a time in rapid succession will be struck violently by the blades of the dasher, and will also be thrown by the blades forcibly against the dash-board C when the latter is used. The result of this action is such a violent agitation of small portions of the mass at a time as could not be imparted to the entire body, this action being effected, first, by the blows of the striker, and, secondly, by the impact of the propelled material against the dasher-blade, and the butter-cells are quickly ruptured. While but a small portion of the mass is thus acted on at once, the main body remains comparatively quiet; but the action of the blades will propel the surface portion of the material outward in the direction of the arrows, and thus impart a gyration to the entire body that will repeatedly bring every portion to the position to be acted on by the striker. The butter extracted falls upon the shelf D and is there retained, while the liquid runs through the perforations or off of the shelf back to the main body to be repeatedly acted on until all the butter is extracted.

Any other striker may be employed that will forcibly impact upon small portions of the material at a time and propel the same against the dash-board. Thus an air-blast may be used, the same being blown through nozzles E, arranged, as shown in Figs. 2 and 3, to cause the air current or currents to strike the cream at the surface and drive portions thereof against the dash-board. This also has the effect of gyrating the mass of material, and, if desired, the shelf may be dispensed with, the butter floating on the comparatively quiescent portion of the material and being held by the action of the current in a quiescent state against the side of the vessel opposite the striker.

It is important that the receptacle be so adjustable that the quantity of liquid acted upon by the striker may be regulated. This may be done in different ways; but I prefer to suspend the receptacle so as to swing on centers $a$, supported by standards $b$, and to tilt it to vary the extent to which the blades dip into the liquid.

The variation may of course be effected by increasing or decreasing the quantity of material in the receptacle.

Without limiting myself to the use of any of the forms of apparatus described, I claim—

1. The improvement hereinbefore described in the art of churning, the same consisting in imparting a violent agitation to small portions at a time of the entire mass to be churned by separating such portions from the surface of the mass and driving the same violently from said surface against a stationary plate, and repeating these operations until the entire mass has been acted upon and the butter is all extracted, substantially as described.

2. The improvement in the art of churning, hereinbefore described, consisting in successively separating small portions of a mass of material to be churned from the mass at the surface and driving them violently against a dash-plate, screening or collecting the butter extracted at one point, returning the liquid to the main mass, and repeatedly bringing portions of the latter into position to be agitated, substantially as described.

3. The improvement in the art of churning, hereinbefore described, consisting in acting successively upon small portions at the surface of the mass of cream by a blast projected to secure a percussive action and atomize the portions stripped from the mass, collecting the butter as it is formed, and repeating these operations upon the liquid until the butter is all eliminated, substantially as described.

In testimony whereof I have signed my name to this specification in the presence of two subscribing witnesses.

JOHN W. BOOKWALTER.

Witnesses:
J. S. BARKER,
W. S. McARTHUR.